Oct. 2, 1923.  
W. H. HERMANN  
1,469,272  
TIRE BUILDING MACHINE (HORIZONTAL ADJUSTMENT)  
Filed Dec. 26, 1918  
3 Sheets-Sheet 1

Patented Oct. 2, 1923.

1,469,272

UNITED STATES PATENT OFFICE.

WALTER H. HERMANN, OF LANCASTER, OHIO, ASSIGNOR TO THE HERMAN TIRE BUILDING MACHINE COMPANY, OF COLUMBUS, OHIO, A CORPORATION OF OHIO.

TIRE-BUILDING MACHINE (HORIZONTAL ADJUSTMENT).

Application filed December 26, 1918. Serial No. 268,401.

*To all whom it may concern:*

Be it known that I, WALTER H. HERMANN, a citizen of the United States of America, residing at Lancaster, in the county of Fairfield and State of Ohio, have invented certain new and useful Improvements in Tire-Building Machines (Horizontal Adjustment), of which the following is a specification, reference being had therein to the accompanying drawings.

As a continuation in part of the invention on tire building machines disclosed in my companion application filed under even date, Serial No. 268,402, there is shown and described in this application a machine which is necessary when various sizes of tires are to be made or tires composed of various kinds of stock, so as to place within easy reach of a workman stock of various sizes and grades, without having a machine of tremendous size nor causing a workman to leave his station at the core or form on which the tire is fabricated.

To this end, I have constructed a double or four unit machine, each unit or machine being similar to the machine above referred to, and provided novel means for horizontally shifting each machine into active position convenient to a workman. Associated with the shifting means are automatic stop devices, so that after the shifting mechanism is placed in operation, it is automatically stopped upon one of the machines or units being correctly positioned.

This horizontal machine will be hereinafter described and then claimed, and reference will now be had to the drawings, wherein—

Fig. 4 is a horizontal sectional view taken on the line IV—IV of Fig. 1, also showing a line II—II on which Fig. 2 is taken.

Figure 2:
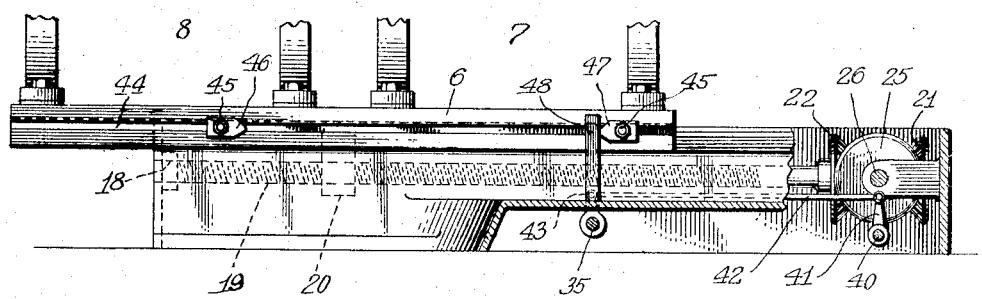
Fig. 2 is a front elevation of the base of the machine, partly broken away and partly in section.
Figure 1:
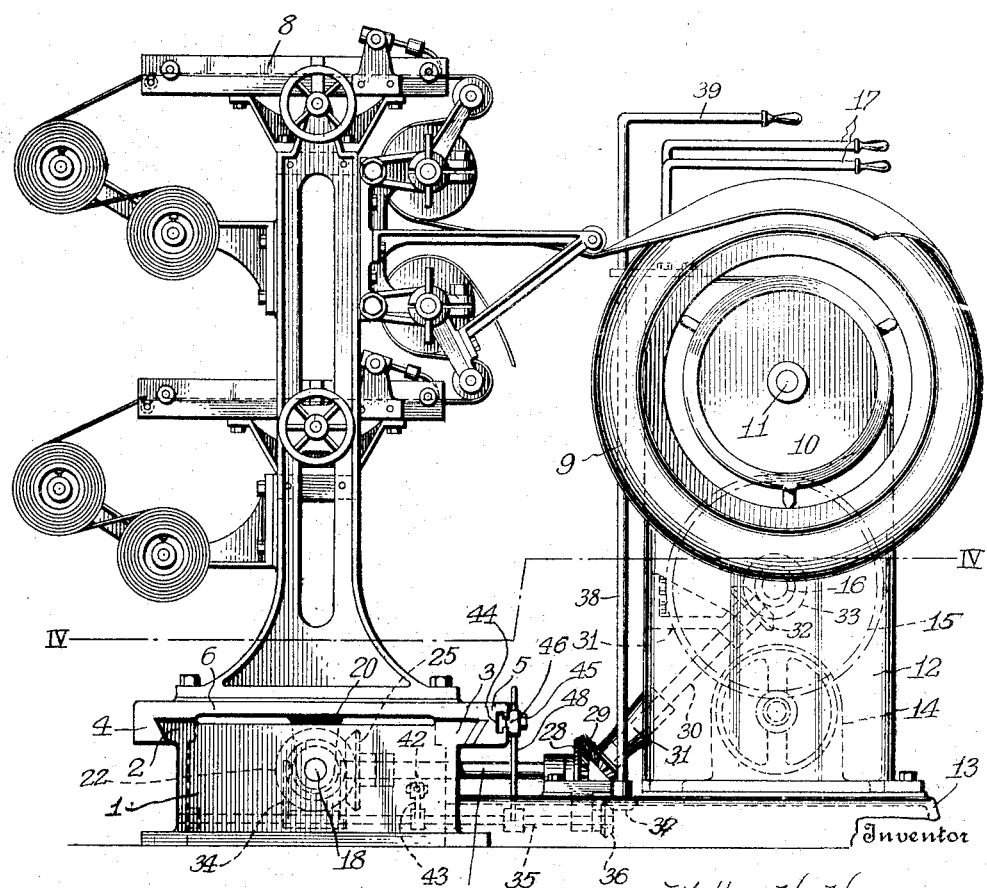
Figure 1 is a side elevation of the machine.
Figure 3:
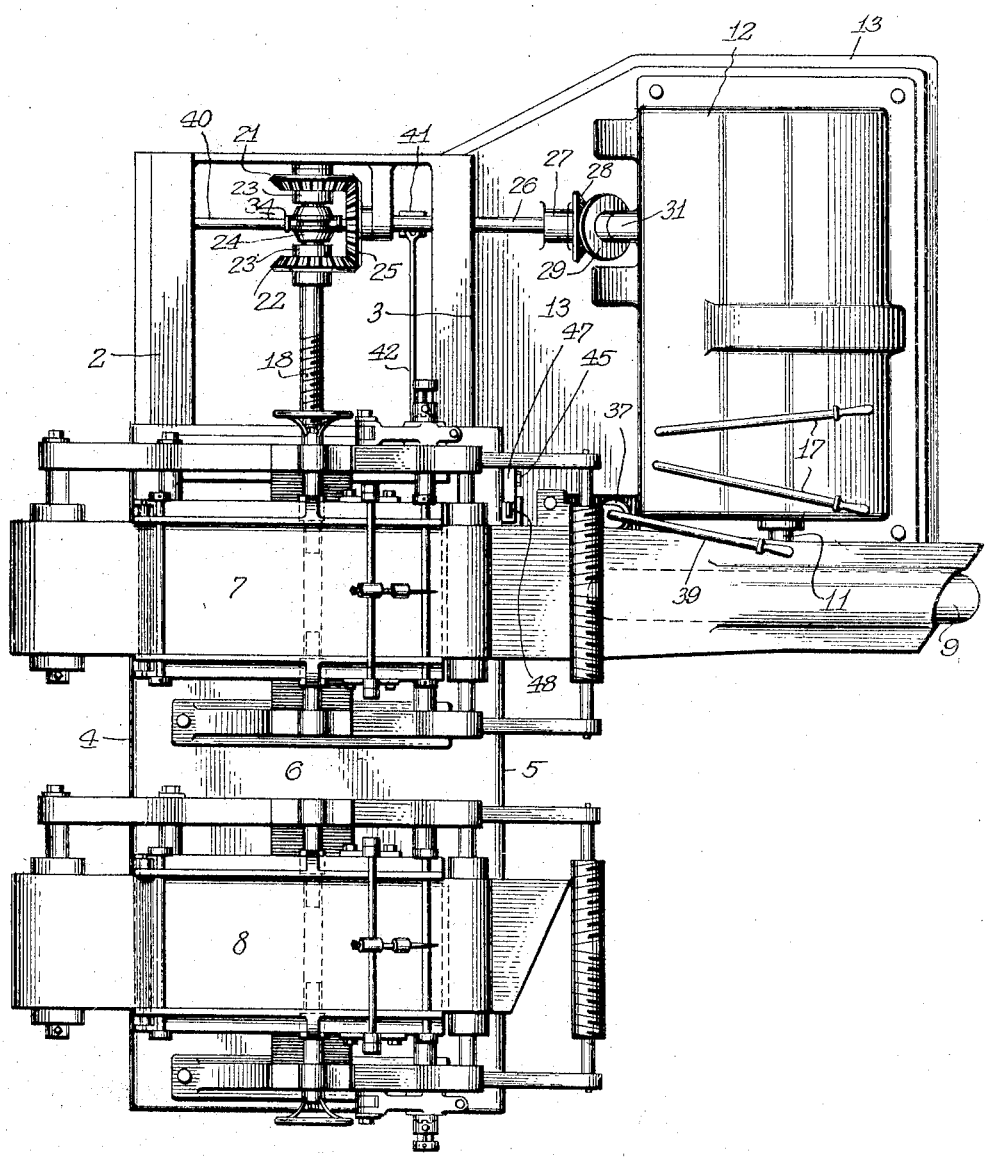
Fig. 3 is a plan of the machine.
Figure 4:
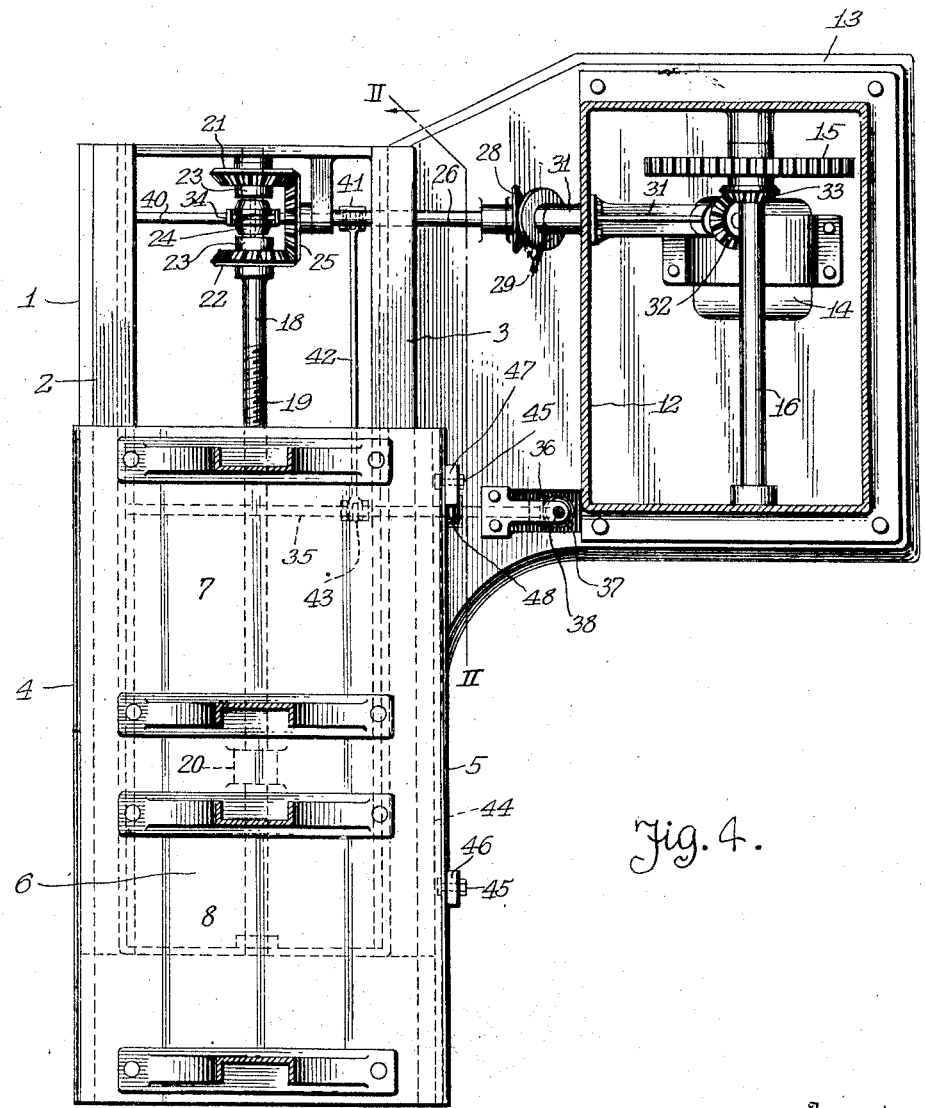

In the drawings, the reference numeral 1 denotes an oblong box-like bed frame providing longitudinal parallel shears or ways 2 and 3 for the guide flanges 4 and 5 respectively of a base plate 6. The base plate 6 is slidable on the shears 2 and 3 and suitably mounted on the base plate are two tire building machines generally designated 7 and 8. These machines are identical in construction and disposed side by side so that either machine may be conveniently used for supplying tire building material or stock of a desired size and grade. The machines 7 and 8 are bodily shiftable on the bed frame and one or the other machine is adapted to aline with a rotary core or form 9, preferably of the collapsible and knock-down type, supported by a chuck or other holding member 10 on a driven shaft 11. The shaft 11 is journaled in the upper portion of a housing 12 mounted on an extension 13 of the bed frame 1, and in said housing or in proximity thereto is a motor 14, constituting a source of power for transmitting a rotary movement to the core or form 9. This is accomplished through the medium of a train of gear wheels 15, shafting 16 and a two speed gear transmission mechanism controlled by levers 17 said transmission mechanism and the contents of the housing 12 having been described in my companion application above referred to.

Journaled in the end walls of the bed frame 1 is a longitudinal shaft 18 having a screwthreaded portion 19 in threaded engagement with a depending nut 20, carried by the machine base 6 intermediate the ends thereof. That end of the shaft 18, adjacent the bed frame extension 13, is provided with loose beveled gear wheels 21 and 22 having clutch hub portions 23 adapted to be engaged by a clutch member 24 between the gear wheels 21 and 22 and slidably keyed on the shaft 18, so that said clutch member may be shifted into engagement with either of the clutch hubs 23 of the beveled gear wheels 21 and 22 to establish a driving relation between either of the beveled gear wheels and the shaft 18, and thus impart a desired rotation to the shaft 18 to shift the base 6 in a desired direction.

To impart movement to the beveled gear wheels 21 and 22 a beveled gear wheel 25 is employed, said gear wheel being mounted on the end of a shaft 26 journaled in bearings 27 carried by the bed frame 1, and the extension 13 thereof. The shaft 26 extends in proximity to the housing 12 and is provided with a beveled gear wheel 28 meshing with a beveled gear wheel 29 mounted on an angularly disposed shaft 30 journaled in bearings 31 carried by the housing 12. The inner end of the shaft 30 has a beveled gear wheel 32 meshing with a similar gear wheel 33 on the shaft 16, and in consequence of this power transmission mechanism the motor 14 may be employed for driving the shaft 16 and shifting the machines 7 and 8 relative to the bed frame 1.

To control the direction of rotation imparted to the shaft 18, the clutch member 24 has been employed and this clutch member is shifted into and out of engagement with either of the clutch hubs 23 of the beveled gear wheels 21 and 22 by a fork or yoke member 34 mounted on a rock shaft 40 journaled in the end of the bed frame 1. The rock shaft 40 has a crank 41, connected by a rod or link 42 to a crank 43 on another rock shaft 35 said rock shaft being journaled in the bed frame 1 and the extension 13 thereof. That end of the rock shaft 35 within the extension 13 has a beveled gear wheel 36 meshing with a similar beveled gear wheel 37 on the lower end of a vertical rock shaft 38, said shaft being journaled in suitable bearings provided therefor by the extension 13 and the housing 12. The upper end of the vertical rock shaft 38 has a crank or operating lever 39 in proximity to the other operating lever 17 of the housing 12, so that workman or attendant of the machine, stationed at the core or form, may readily control the operation of the entire machine.

The guide flange 5 of the machine base 6 has a longitudinal groove 44 that may be key shaped or dove-tailed in cross section. Slidable in this groove and adapted to be fixed therein by set screws 45 or other securing means are stops 46 and 47 adapted to impinge against an arm 48, carried by the rock shaft 35 and extending upwardly through a slot or opening provided therefor in the extension 13.

Assuming that the machines 7 and 8 are capable of providing the necessary material or stock for building tire bodies on the core 9, it is only necessary for the operator of the machine to shift one of the operating levers 17 to place the core 9 at a desired speed for the application of the material or stock from the machine 7. After a tire body has been built up from material or stock of the machine 7 and it is desired to build another tire body from the material or stock of the machine 8, or it is desired to use material or stock from both machines in building a single tire body, then, the operator of the machine shifts the lever 39 and rocks the shafts 38, 35 and 40. The rocking of the shaft 35 moves the arm 48 out of engagement with the stop 47, and the rocking of the shaft 40 shifts the clutch member 24 into engagement with the clutch hub 23 of the beveled gear wheels 21 or 22 necessary to cause the longitudinal shaft 18 to revolve in proper direction to feed the machines 7 to the right in order that its original position may be occupied by the machine 8. With the longitudinal shaft 18 revolving the nut 20 feeds thereon and carries the base 6 on the bed frame 1 until the stop 46 impinges against the arm 48 and shifts said arm to rock the shaft 35. The manner in which the shaft 35 is connected to the operating lever 39 and the clutch member 24 causes said lever and member to be restored to a neutral position, and with the clutch member 24 out of engagement with the clutch hubs 23 of both of the beveled gear wheels 21 and 22, the machine 8 will remain in the position to which it has been shifted so that the material or stock carried thereby may be applied to the core 9 or to other stock or material previously placed thereon.

In view of my companion application Serial No. 268,402 it is believed that the utility and advantage of using two machines, side by side, together with means for bodily shifting said machines will be readily understood, particularly by those conversant with the art, and while in the drawings there is illustrated a preferred embodiment of the shifting and controlling mechanism, it is to be understood that the structural elements are susceptible to such modifications and variations as fall within the scope of the appended claims.

What I claim is:—

1. Means for supplying different kinds of material to a driven tire building core comprising material carrying machines adapted to be shifted back and forth in a horizontal plane at a right angle to the vertical plane of the driven core so that the material from either machine may be used on the core, power shifting means for said machines operatable in synchronism with said core, and adjustable stops carried by said machines adapted to cause a cessation in the operation of said power shifting means when one of said machines is correctly positioned relative to the core.

2. Means for supplying different kinds of material to a tire building core, as in claim 1, characterized by said shifting means including a clutch mechanism and rocking elements, automatically brought into action to place shifting means in operation.

3. The combination of a bed frame, a housing on said bed frame, a core supported from said housing, machines slidable on said bed frame and adapted to be shifted in front of said core, and means in said housing and extending into said bed frame adapted to effect movement of said machines on said bed frame.

4. The same combination as set forth in claim 3 and wherein said means includes a screw and a nut in the bed frame, and a manually controlled clutch to determine the direction in which the machines are shifted.

5. The same combination set forth in claim 3, and wherein stop devices form part of said machines by causing a cessation in the shifting movement of said machines on said bed frame.

6. In a machine wherein various kinds of stock is adapted to be placed on a power driven core from machines movable relative to said core:—means supporting said machines to guide said machines in a straight line at an approximate right angle to the vertical plane of the core, machine moving means operatable in synchronism with said power driven core, and means against which said machines may impinge to control the operation of said machine moving means relative to said power driven core.

7. A machine as called for in claim 6, wherein said machine moving means includes a screw shaft and a nut with a clutch mechanism controlling the operation of said screw shaft by said power driven core.

8. The combination of a core, core operating means, stock supplying means for said core adapted to be shifted by said core operating means, a rock shaft adapted to be manually actuated to control the shifting of said stock supplying means by said core operating means, and means on said rock shaft against which said stock supplying means may impinge to automatically control the shifting of said stock supplying means by said core operating means.

9. In a tire fabricating machine, the combination of a core, supports for parallel pieces of stock, the support for one piece of stock being in alinement with said core and adapted to be bodily shifted sidewise away from said core as the other support for the other piece of stock is bodily brought into alinement with said core, and means actuated by the receding support to control the advancing support.

10. A tire fabricating machine as called for in claim 9, and core operating means adapted to also bodily shift said supports for the pieces of stock.

In testimony whereof I affix my signature in the presence of two witnesses.

WALTER H. HERMANN.

Witnesses:
 ANNA M. DORR,
 KARL H. BUTLER.